United States Patent
Olson et al.

(10) Patent No.: US 6,278,585 B1
(45) Date of Patent: Aug. 21, 2001

(54) TRANSDUCER SUSPENSION TERMINATION SYSTEM

(75) Inventors: Stephen Arnold Olson, Palo Alto; Darrell Dean Palmer; Anthony Vesci, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/294,451

(22) Filed: Apr. 19, 1999

(51) Int. Cl.[7] .............................. G11B 5/55; G11B 21/08; G11B 5/48; G11B 21/16
(52) U.S. Cl. .................................. 360/264.2; 360/245.9
(58) Field of Search ................. 360/264.2, 266.3, 360/245.8, 245.9

(56) References Cited

U.S. PATENT DOCUMENTS

| | | | |
|---|---|---|---|
| 5,001,591 | 3/1991 | Nakashima | 360/126 |
| 5,027,239 | 6/1991 | Hagen | 360/244.2 |
| 5,498,840 | 3/1996 | Maggio et al. | 174/260 |
| 5,631,786 | 5/1997 | Erpelding | 360/97 |
| 5,661,896 | 9/1997 | Erpelding | 29/603.01 |
| 5,739,982 | 4/1998 | Arya et al. | 360/234.5 |
| 5,754,370 | 5/1998 | Tsuchiya et al. | 360/234.5 |
| 5,757,585 | 5/1998 | Aoyagi et al. | 360/234.5 |
| 5,768,068 | 6/1998 | Eckberg et al. | 360/313 |
| 5,781,380 | 7/1998 | Berding et al. | 360/264.2 |
| 5,808,834 | 9/1998 | Jurgenson | 360/234.5 |
| 5,815,349 | 9/1998 | Frater | 360/245.7 |
| 5,835,306 | 11/1998 | Bennin | 360/234.5 |
| 5,844,750 * | 12/1998 | Takaike | 360/244.4 |
| 5,844,751 | 12/1998 | Bennin et al. | 360/244.3 |
| 5,844,753 * | 12/1998 | Inaba | 360/264.2 |
| 5,859,749 | 1/1999 | Zarouri et al. | 360/245.9 |
| 5,862,010 | 1/1999 | Simmons et al. | 360/97.01 |
| 5,995,322 * | 11/1999 | Yanagihara | 360/264.2 |
| 6,163,443 * | 12/2000 | Hatagami et al. | 360/323 |

FOREIGN PATENT DOCUMENTS

| | | |
|---|---|---|
| 0770992 | 5/1997 | (EP) . |
| 01069361 | 3/1989 | (JP) . |
| 01069362 | 3/1989 | (JP) . |
| 02039447 | 2/1990 | (JP) . |
| 05303721 | 11/1993 | (JP) . |
| 06076257 | 3/1994 | (JP) . |
| 09190686 | 7/1997 | (JP) . |
| 09213839 | 8/1997 | (JP) . |

\* cited by examiner

Primary Examiner—David L. Ometz
Assistant Examiner—Julie Anne Watko
(74) Attorney, Agent, or Firm—Douglas R. Millett

(57) ABSTRACT

A suspension system comprises an actuator arm and two suspensions. Each suspension has a load beam and a laminated member comprised of a support layer, an electrically insulating layer, and an electrically conducting layer. The laminated members are etched to form electrical lines for each suspension. The laminate member of each suspension is bent along the side of the arm such that they overlap one another in order to reduce the required space.

10 Claims, 8 Drawing Sheets

TRANSDUCER SUSPENSION TERMINATION SYSTEM

BACKGROUND OF THE INVENTION

1. Field of the Invention

This invention relates generally to transducer suspension systems and more particularly to suspension systems having integral electric leads.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some proposed disk drives, the slider (or carrier) rides on a liquid film or bearing on the disk. A suspension assembly connects the slider to a rotary or linear actuator. The suspension provides support for the slider.

The suspension must meet several requirements. The suspension must be flexible and provide a bias force in the vertical direction. This is necessary to provide a compensating force to the lifting force of the air bearing in order to keep the slider at the correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving from side to side, which will result in the head reading the wrong track.

Disk drives have become smaller in size, and the recording track density has increased dramatically. This has necessitated the use of smaller and smaller heads and suspensions. The smaller size makes it more difficult to string individual wires along the suspension to the head. Recently, electrical leads (or lines) have been integrally formed directly into the suspension, by etching or deposition in order to do away with the need to string separate wires.

It is sometimes difficult to efficiently connect these electrical lines to the electrical connections at the rear of the suspension. Often, the electrical lines are spread out in a vertical plane at the rear of the suspension for attachment to a connection card mounted to the side of the actuator arm. As the vertical space between the disks get smaller and smaller, there is less vertical space available for the electrical lead termination.

SUMMARY OF THE INVENTION

Briefly, in a preferred embodiment of the present invention, a suspension system comprises an actuator arm and two suspensions. Each suspension is attached to an opposite surface of the arm. Each suspension comprises a rigid load beam and a laminated member. The laminated member is comprised of three layers: a supporting steel layer, an electrically insulating layer, and an electrically conducting layer. The laminated member is etched such that the electrical leads are formed in the conducting layer.

The electrical leads run from a transducer head, located at the distal end of each suspension, back to a connection card located on the side of the actuator arm. As the electrical leads leave the rear of the suspension, they are bent down such that they run along the side surface of the actuator arm. The electrical leads from the top and bottom suspensions overlap one another as they run along the side of the arm, thereby reducing the necessary vertical height. The first suspension has a laminated member having all three layers present in the overlap section. The laminated member of the second suspension has the lower support layer removed in the overlap section such that its insulating layer provides insulation between both sets of electrical leads.

For a fuller understanding of the nature and advantages of the present invention, reference should be made to the following detailed description taken in conjunction with the accompanying drawings.

DESCRIPTION OF THE PREFERRED EMBODIMENTS

Figure 1:
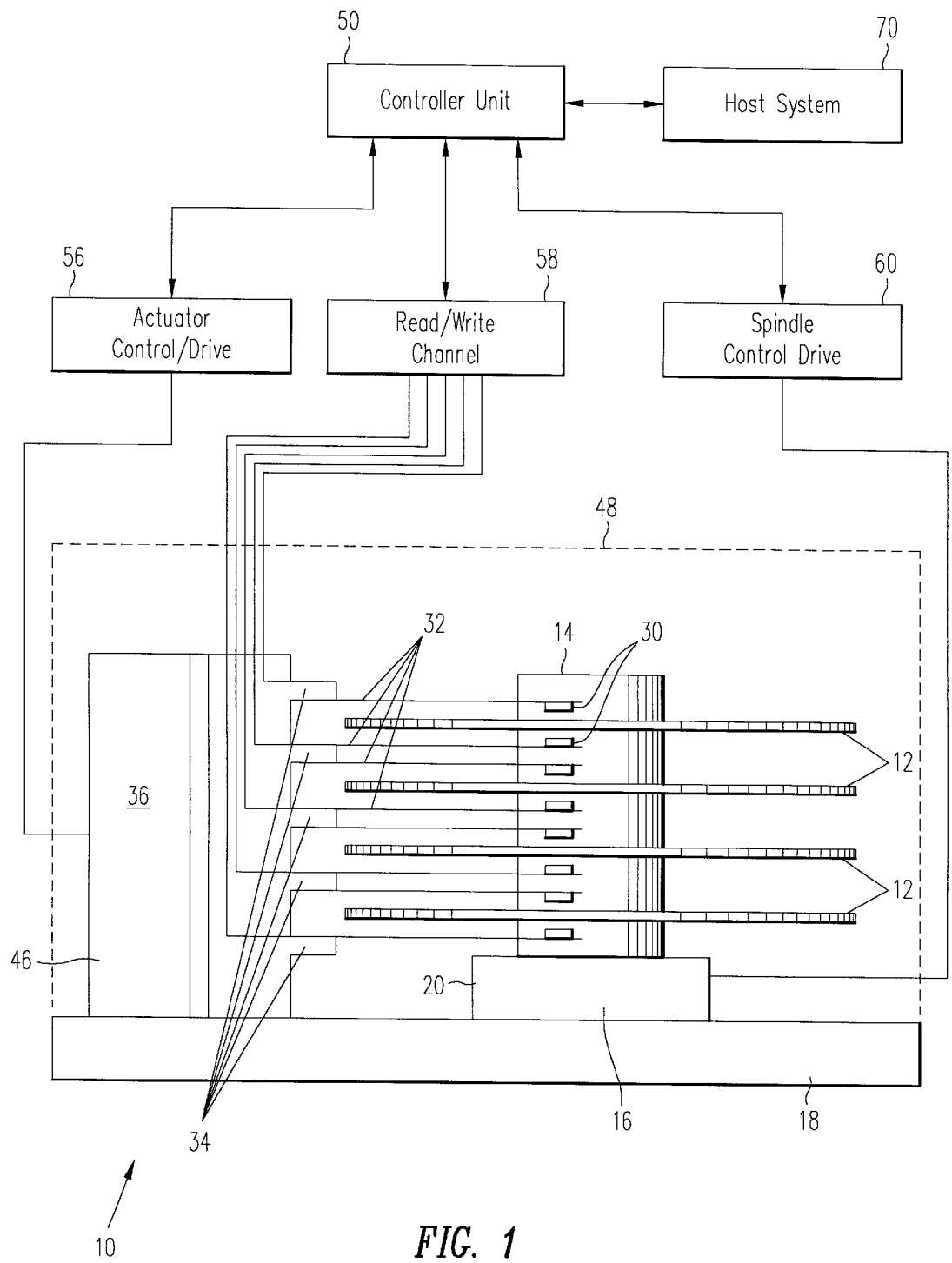
FIG. 1 is a schematic diagram of a data storage system of the present invention.
Figure 2:
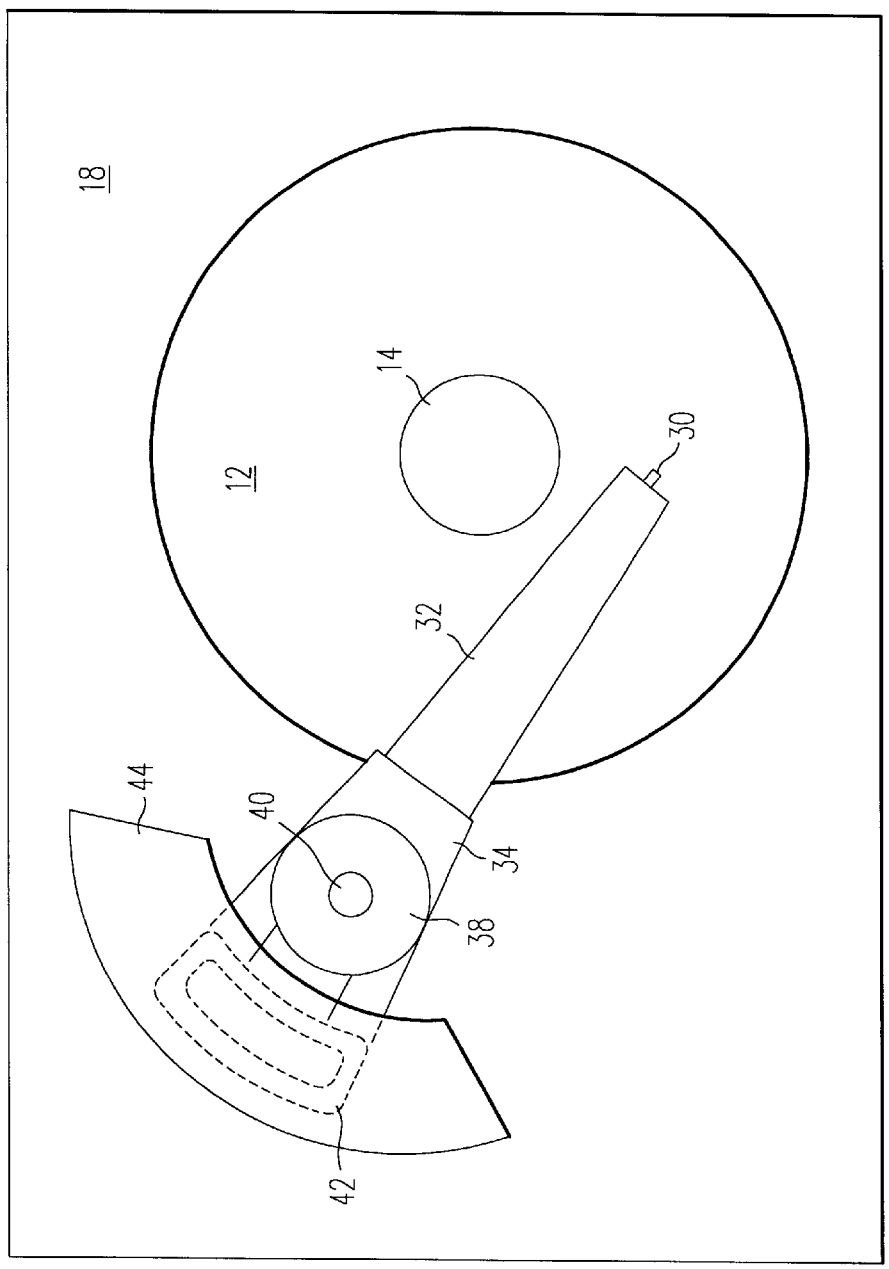
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of transducer assemblies or heads 30 are positioned over the disks 12 such that each surface of the disks 12 has a corresponding head 30. The head 30 is comprised of an air bearing slider and read and write transducer elements. Each head 30 is attached to one of a plurality of suspensions 32 which in turn are attached to a plurality of actuator arms 34. Arms 34 are connected to a rotary actuator 36. In a preferred embodiment, the arms 34 are an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspensions 32, arms 34 and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 60 may send digital data to controller 50 to be stored on disks 12, or may request the digital data be read from disks 12 and sent to the system 70. The basic operation of DASD units is well known in the art.

Figure 3:
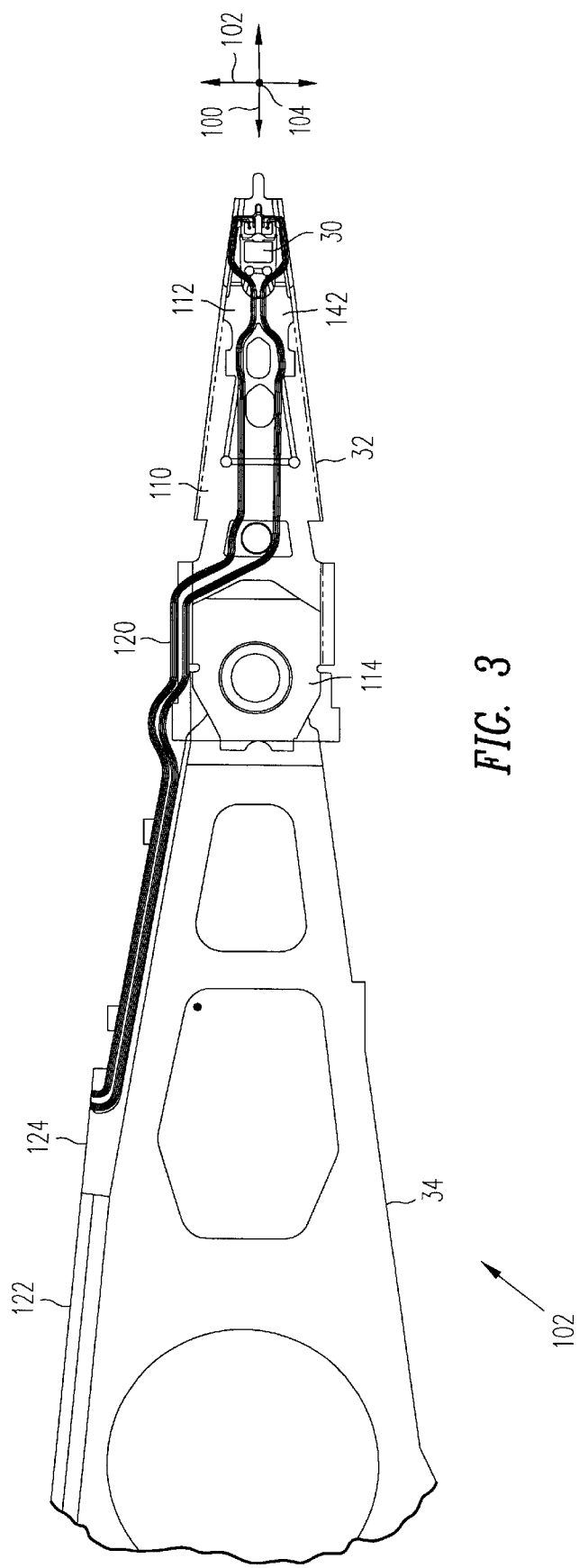
FIG. 3 is a detailed top view of a suspension system of FIG. 1.

FIG. 3 shows a top view of a head 30, suspension 32 and actuator arm 34. The combination of these elements shall be referred to as a suspension/arm assembly 102. The suspension/arm assembly 102 typically has a second suspension 32 (not shown) on its bottom surface. The suspension 32 and arm 34 have a longitudinal axis 100, a lateral axis 102 and a vertical axis 104. Suspension 32 is comprised of a load beam 110 and a laminated member 112. Laminated member 112 is formed from a multi-layer laminated material comprised of a steel support layer and electrically insulating layer, and an electrically conducting layer. The various layers of the laminated member 112 are etched away in a photolithographic process to form the desired shapes. Alternatively, the layers could be built up in a deposition process.

The laminated member 112 is attached to the load beam 110. The load beam 110 is attached to a swage member 114. Welding or adhesive may be used as the means of attachment. The swage member 114 is then swaged to the arm 34.

The suspension 32 is extremely small. The distance from the end of the actuator arm 34 to the end of the suspension is typically on the order of 15 mm. The head 30 typically measures 1.25 mm×1.00 mm×0.3 mm.

The electrically conducting layers and electrically insulating layers are etched to form electrical lines (or leads) 120 which run from a rear termination pad area located on a connection card 122 to the head 30. The connection card 122 is mounted vertically against the side of the arm 34. The electrical lines 120 are bent vertically at a section 124 to meet with the card 122. The electrical lines 120 terminate and are electrically attached to the head 30 at head termination pads which are located on the head 30.

The support layer of the laminated member 112 is formed into a flexure member 142 at the end of the suspension 32. Flexure member 142 provides a gimbal mount for attachment of the head 30. The gimbal mount allows the head 30 to pivot in order to adjust its orientation (static attitude) to achieve the proper air bearing between the head 30 and disk 12 while the disk 12 is rotating. The flexure 142, and load beam 110 also serves the purpose of providing support for the electrical lines 120, among other purposes such as providing stiffness, balance and an area for bonding or welding.

Figure 4:
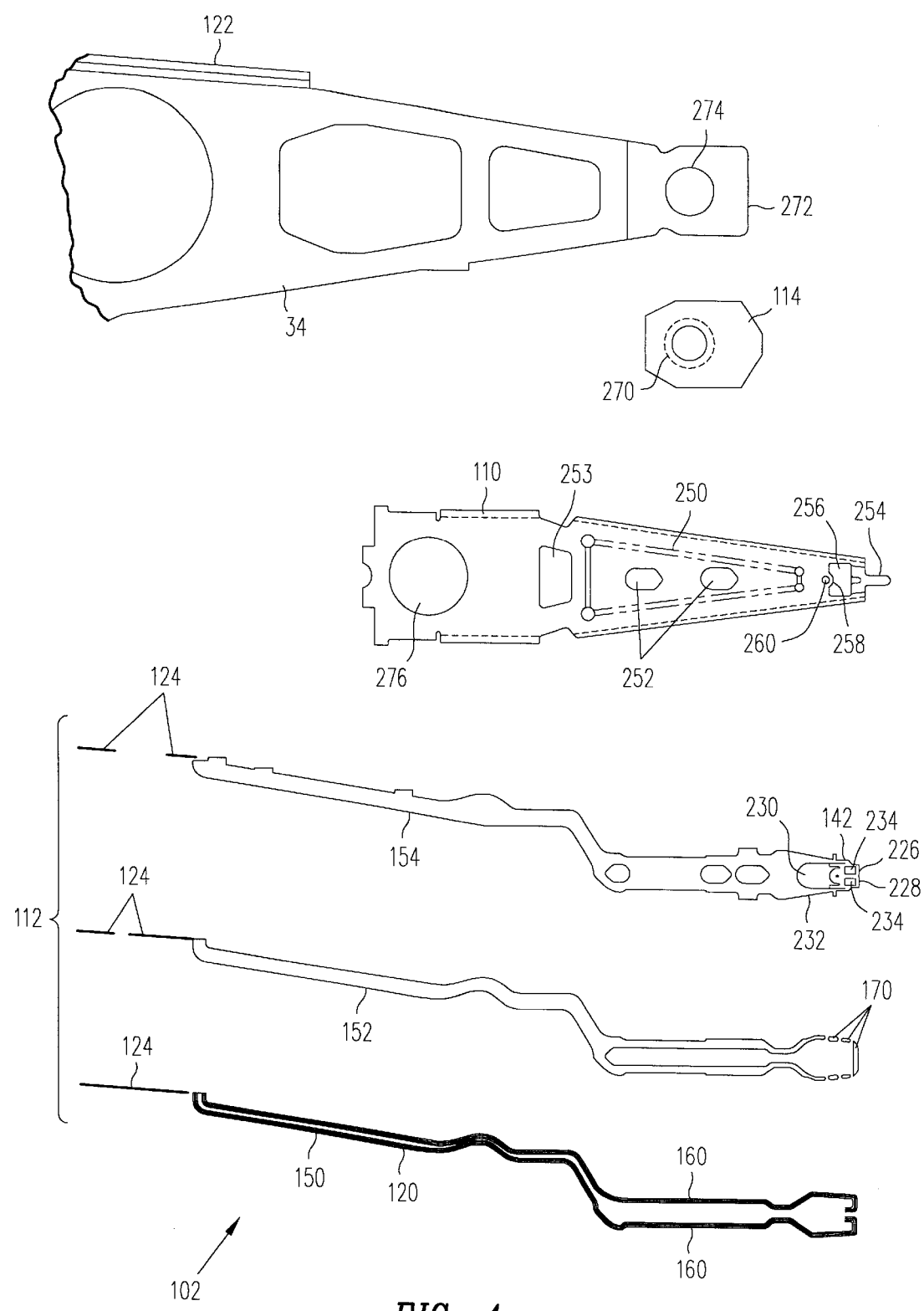
FIG. 4 shows top views of the different members and layers of the suspension system of FIG. 1.

FIG. 4 shows a plan layout top view of each of the separate elements of the suspension/arm assembly 102 of FIG. 3. The head 30 has been omitted in this figure. Laminated member 112 is comprised of an electrically conducting layer 150 and electrically insulating layer 152 and a support layer 154. Layers 150, 152 and 154 are layers formed from a single laminated sheet of material. In FIG. 4 each of the layers has been separated in order to better view each of their features. However, the three layers 150, 152 and 154 are actually integrally formed together. The member 112 is formed from the integral laminated sheet by using photolitographic etch processes as are known in the art.

Layer 150 is made of an electrically conducting material such as copper or a copper alloy. In a preferred embodiment, the material is C7025 copper alloy and has a thickness of between 0.012 mm and 0.025 mm and preferably 0.018 mm.

Layer 152 is made of an electrically insulating material and in the preferred embodiment is made of polyimide or Teflon. The layer has a thickness of between 0.010 mm and 0.025 mm and preferably 0.018 mm.

Layer 154 is made of a thin stiff material which is able to bend slightly, and in the preferred embodiment is made of 300 series stainless steel. The thickness of this layer is between 0.012 mm and 0.025 mm and preferably 0.020 mm.

The electrical lines 120 of layer 150 are formed into four separate lines 160 of two sets of two lines each. In the drawing of FIG. 4 the four separate lines 160 are not distinguishable, and only the two sets of lines are viewable. The lines 120 start at the connection card 122. Connection card 122 provides connection to the read/write channel 58. The connection card 122 is located on the side of the actuator arm 34 when the drive is fully assembled. The lines 120 run in a vertical plane along the side of the arm 34 in a section 124. The lines 120 are then bent upward and run along the top surface of the arm 34. Lines 120 run towards the center longitudinal axis 100 of the suspension 32. Lines 120 then run in a generally longitudinal direction towards the head 30.

At the distal end of suspension 32, the two sets of lines 120 separate and run along either side of head 30, then turn backward to the head 30 to terminate at the front face of head 30 at the head termination pads. This is necessary because the transducer electronics are located on the front face of the slider. This face of the slider is the trailing face as the disk rotates beneath the suspension during operation. Lines 120 are bent 90° vertically in order to interface with the pads on the head 30.

Layer 152 is shaped to provide electrical insulation protection to the lines 120 of layer 150 which directly overlay the layer 152. Layer 152 forms an insulating strip directly beneath the lines 120 of layer 150. At the head area, layer 152 is shaped into a series of pads 170 which underlie lines 120. This is done to allow the lines 120 to be more flexible at the head area in order to minimize the change in static attitude of the head caused by the exertion of force by the lines 120 and to accommodate different temperature and humidity conditions.

Layer 154 provides support for the lines 120. At its distal end, Layer 154 forms the flexure member 142. Flexure 142 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allow the lines 120 to bend as they approach the termination pads of head 30.

Load beam 110 is generally flat and rigid and made of a stainless steel or other rigid material. In a preferred embodiment, the load beam 110 is made of 300 series stainless steel and has a thickness of between 0.025 mm and 0.100 mm and preferably 0.051 mm. It is desirable to maintain the weight and inertia of load beam as small as possible without compromising its structural rigidity.

Load beam 110 has a depressed section 250 which is used to provide additional structural stiffness. Section 250 has a pair of apertures 252 which are used for tool alignment during the manufacturing process. Another aperture 253 is used to form a spring section for the load beam 110.

Load beam 110 has a distal end with a tab 254 which is used for merge and dynamic loading and unloading of the suspension. An aperture 256 is located behind tab 254. A tongue section 258 extends into aperture 256. A stamped raised button or dimple 260 is located on tongue 258. Dimple 260 contacts tongue section 232 of flexure 142 and allows head 30 (located below tongue section 32) to gimbal (pitch and roll) slightly such that it is able to maintain the proper air bearing orientation. Load beam 110 is also formed by photolitographic process and the raised features are stamped. Laminated member 112 and the load beam 110 are attached by welding. Head 30 is attached to flexure tongue 232 by adhesive.

Swage plate 114 is made of stainless steel and has a thickness of between 0.100 mm and 0.200 mm and preferably 0.178 mm. Swage plate 114 has a swage spud 270 which is a raised cylindrical flange containing a cylindrical aperture.

Arm 34 is made of stainless steel or aluminum and has a thickness of between 0.8 mm and 1.0 mm and preferably 0.9 mm. Arm 34 has a distal end 272 which has an aperture 274 for receiving the spud 270 of swage plate 114.

The construction of the suspension/arm assembly 102 may now be understood. Laminated member 112 is formed from the three layer laminated material. The laminated member 112 is then welded to load beam 110. The load beam 110 is then welded to swage plate 114. The head 30 is then attached to flexure 142 and the leads 120 are bonded to the head pads. The swage spud 270 of swage plate 114 is placed in aperture 274 of arm 34 and swaged into place.

Figure 5:
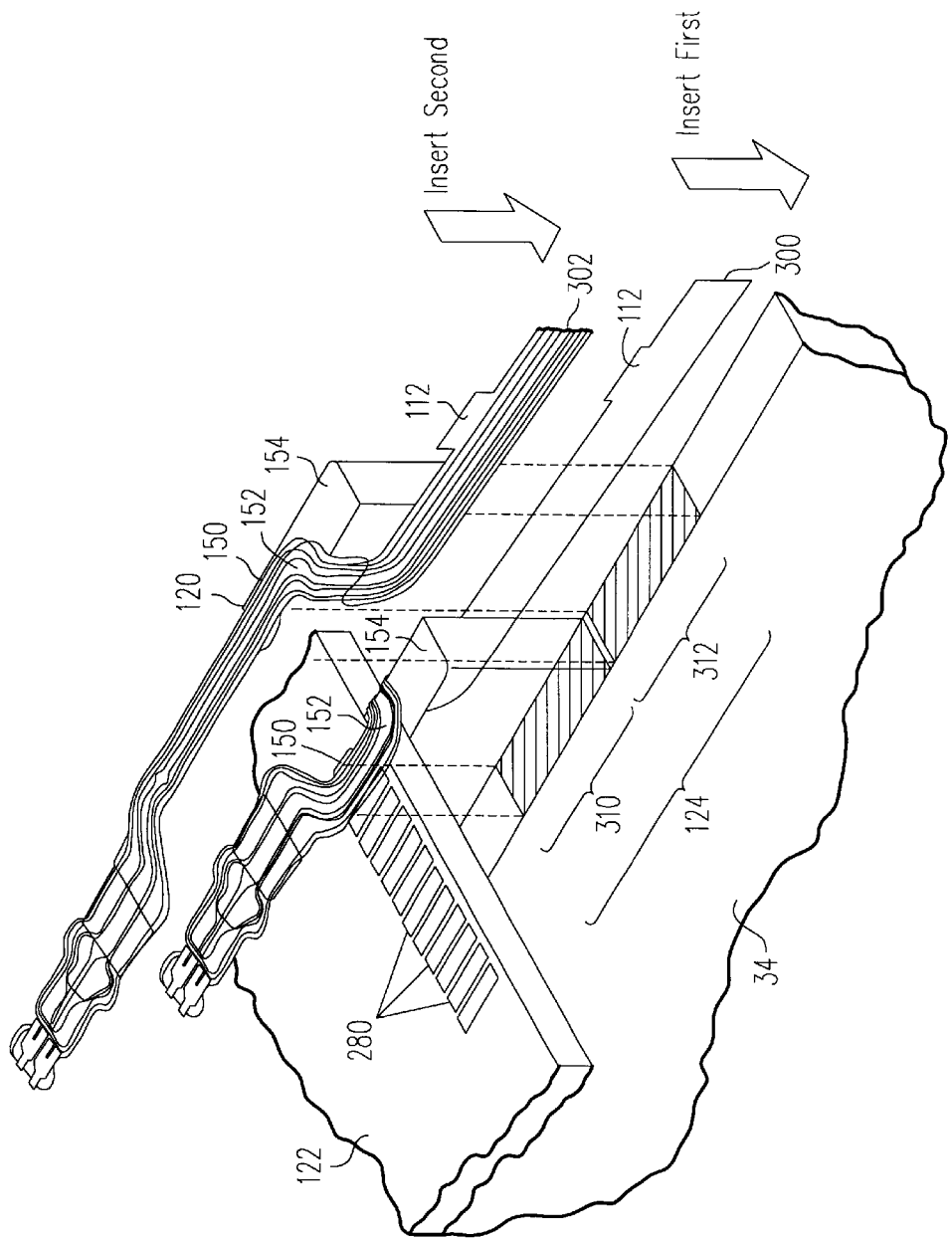
FIG. 5 shows a perspective view of the overlapping electrical leads.

FIG. 5 shows a perspective view of the side of arm 34. The connection card 122 is shown having a plurality of termination pads 280 for connection to the electrical lines 120. Each arm 34 typically has two suspensions. A first top suspension 300 is attached to the top surface of arm 34 and a second bottom suspension 302 is attached to a bottom surface of arm 34. Here the laminated member 112 from both the top and bottom suspensions are shown. Each laminated member 112 has an electrical layer 150 containing the electrical lines 120, an insulating layer 152, and a support layer 154.

During manufacture, the top suspension 300 is placed first. Laminated member 112 of the top suspension runs along arm 34 along a section 310. Laminated member 112 of top suspension 300 has all three layers present in section 300. The bottom suspension 302 is placed next and its laminated member 112 runs along the side of arm 34 along section 124. Section 124 includes both sections 310 and a section 312. Laminated member 112 of bottom suspension 302 has all three laminated layers present in section 312, however, it has only the insulating layer 152 and electrically conducting layer 150 in section 310. The supporting layer 154 has been removed in section 310.

Figure 6:
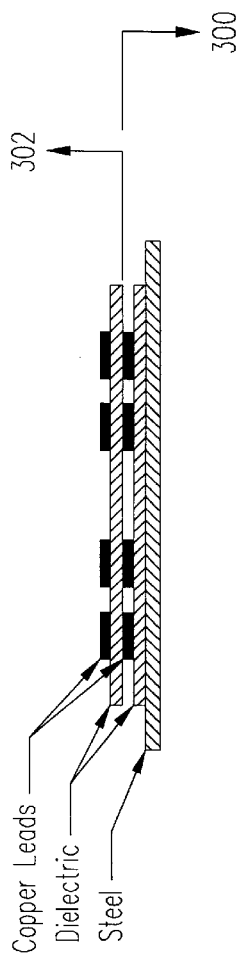
FIG. 6 shows a cross sectional view of the overlapping electrical leads.

FIG. 6 shows a cross sectional view of the overlapping suspensions 300 and 302 at section 310. The top two layers (conducting layer 150 and insulating layer 152) are from suspension 302. The bottom three layers (conducting layer 150, insulating layer 152, and support layer 154) are from suspension 300.

Figure 7:
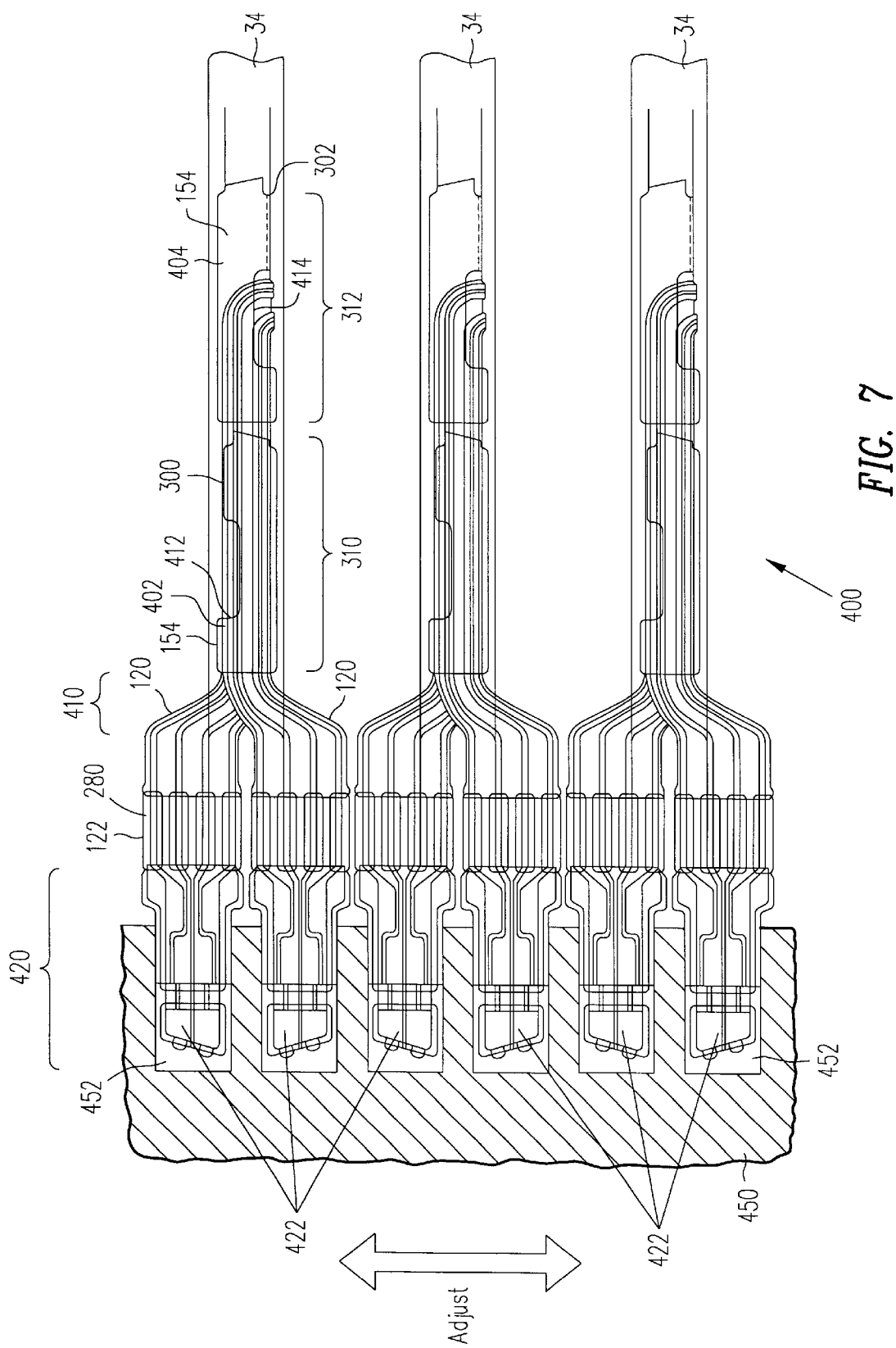
FIG. 7 shows a side view of an actuator arm stack of the present invention.

FIG. 7 shows a side view of an actuator arm stack 400 having a plurality of actuator arms 34. Each arm 34 has a top and a bottom suspension 300 and 302 respectively. The laminated member 112 of suspension 300 is bent vertically down against the side of arm 34 at section 310. Support layer 154 in section 310 forms a tab section 402 to provide support in section 310. The laminated member 112 of suspension 302 is bent vertically upward against arm 34 at section 312. Support layer 154 at section 312 forms a tab section 404 which provides support. The laminate member 112 of suspension 302 continues back over section 310, overlapping the underlying laminated member 112 from suspension 300. This overlapping allows a more compact height design.

Tab 402 has a notched section 412 and tab 404 has a notched section 414. Notch sections 412 and 414 are located at the sections where the electrical lines 120 run from one surface to the side surface of arm 34. The notches 412 and 414 remove the support layer 154 from beneath the section. This allows the lines 120 to bend from one surface to the other without crimping and allows for a smoother transition.

At a section 410 the lines 120 from both suspensions 300 and 302 separate and spread out such that each of the lines 120 is directed to a separate pad 280 of card 122. The pads 280 are where the electrical lines 120 are electrically bonded.

At the rear distal end 420 of each laminated member 112 is a termination tail 422. Termination tail 422 provides electrostatic discharge ("ESD") protection by shorting together the electrical lines during the manufacturing process. This prevents damage to the delicate transducer electronics of the head 30.

A tool 450 has a plurality of slots 452 for receiving each tail 422. The tool 450 is temporarily placed against the arm stack 400 during manufacturing. Tool 450 may be adjusted up or down until the lines 120 are correctly positioned over pads 280. The lines 120 are then bonded to pads 280. Solder bonding, ultrasonic bonding, or conductive adhesive bonding may be used. The tool 450 is then removed and the remaining tails 420 are broken off.

The tool 450 is made of a rigid material which may be precisely formed. In the preferred embodiment, the tool 450 is made of stainless steel. The slots 452 form a plurality of tines 454 which separate the slots 452. The dimensions of tool 450 are constrained within the dimensional requirements of the lines 120, pads 280 and card 122. The tines 452 may be formed at an angle relative to the plane of the surface of card 122 in order to provide the desired angle for bonding the lines 120 to pads 280. The widths of the slots 452 are sized to provide for easy insertion of the tails 422 while still holding them tight enough to prevent vertical (axis 104) movement.

Figure 8:
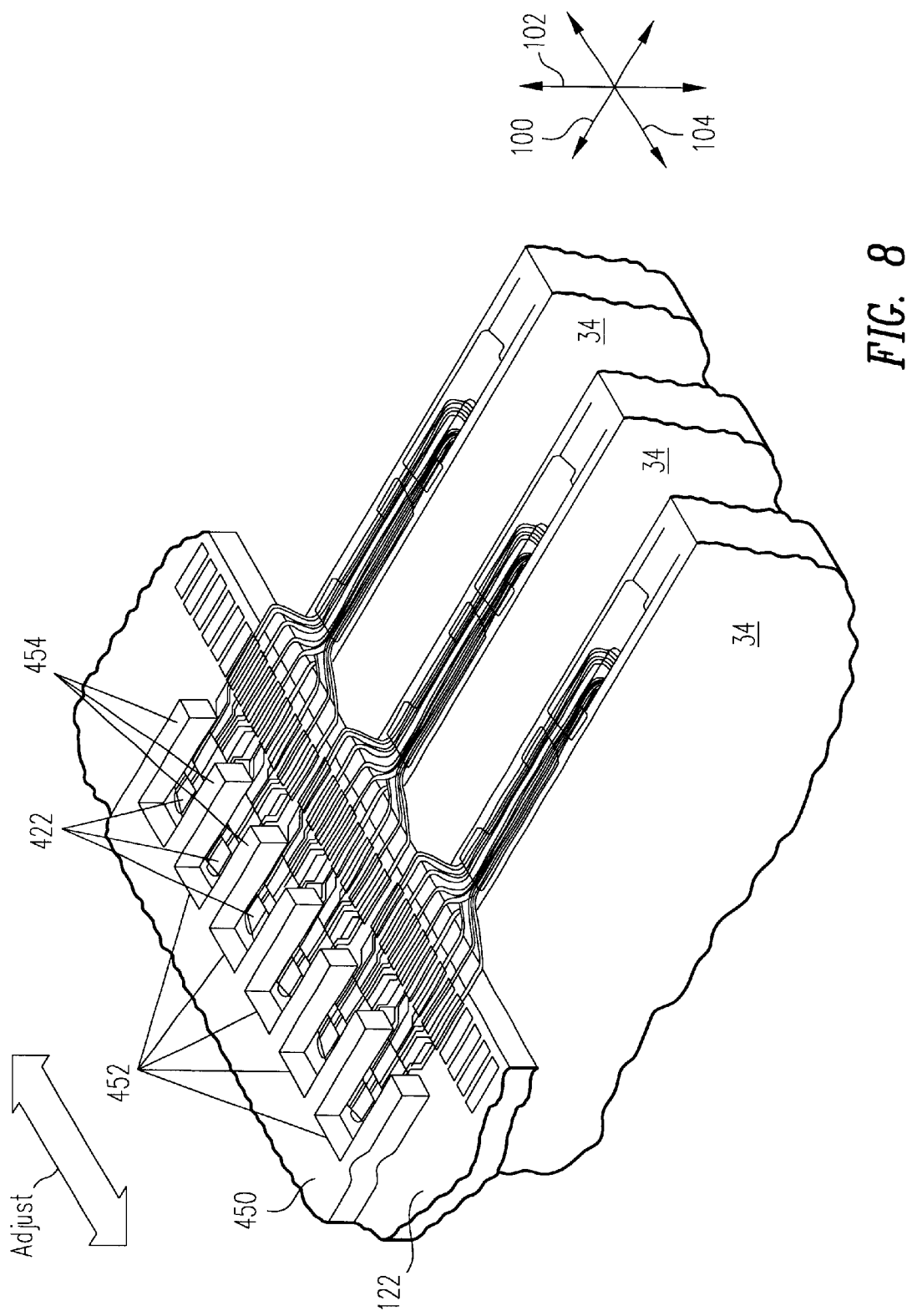
FIG. 8 shows a perspective view of the arm stack of FIG. 7.

FIG. 8 shows a perspective view of the arm 34 and tool 450. It can be seen that tool 450 has a comb shape and may be precisely adjusted up or down as desired. This insures precise positioning of the electrical lines 120 during manufacture. The tool provides a single adjustment for the plurality of lines 120 and holds them in position until they are bonded to pads 280.

It can be seen that the laminated members 112 of both top and bottom suspensions 300 and 302 overlap in section 310 to save height. As the electrical lines 120 approach the pads 122 they spread out a minimum amount necessary to achieve good electrical bonding to the pads 280. The laminated members then end in their termination tails 422 which have a very compact height and are notched down in comparison with the section over the pads 280. This notched section of the termination tails 422 allows for space for a larger tine 454 width.

Figure 9:
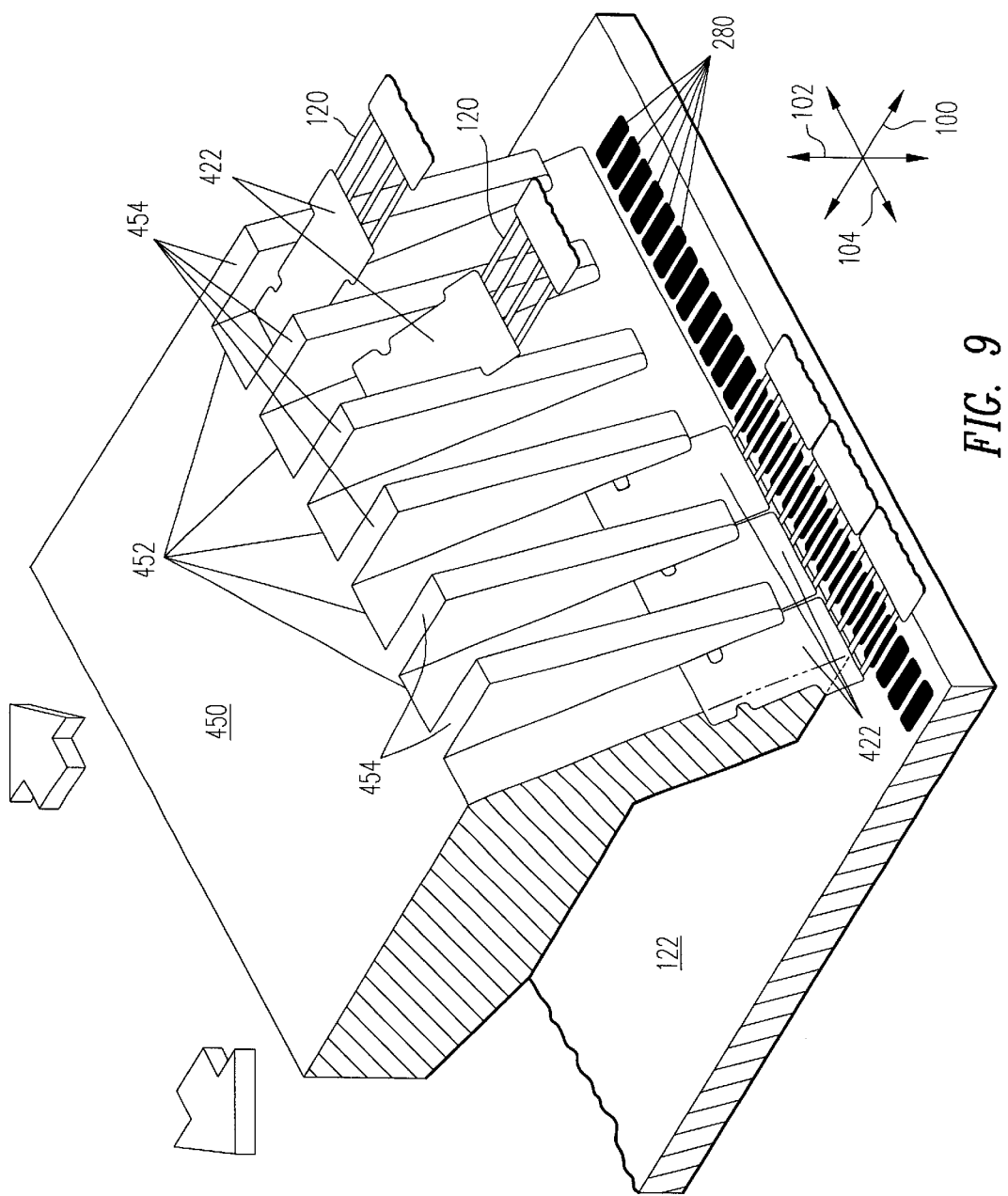
FIG. 9 shows a perspective view of an alternative embodiment of the arm tool.

FIG. 9 shows a perspective view of an alternative embodiment of the tool 450. In this embodiment the slots 454 are angled upward at an angle to receive the tails 422. The tines 454 do not extend all the way to the bottom of the tool 450. This allows for the notched shoulder of tails 422 to fit under the tines 454 in the correct position. It can be seen that the lines 120 are pushed downwards against pads 280 for bonding. As lines 120 are pushed downward, the tail 422 is received into its respective slot 454 and then slightly upward matching the angle of the tool slot. Once all the tails 422 are in position, the tool 450 may be moved along the vertical axis 104 to correctly position the lines 120 over pads 280.

While the preferred embodiments of the present invention have been illustrated in detail, it should be apparent that modifications and adaptations to those embodiments may occur to one skilled in the art without departing from the scope of the present invention as set forth in the following claims.

We claim:

1. A transducer suspension system comprising:

an actuator arm having a top surface, a bottom surface and two side surfaces;

a first suspension connected to the top surface of the arm, the first suspension having a first laminated member having a first support layer, a first electrically insulating layer, and a first electrically conducting layer, the first conducting layer being formed into a plurality of electrical leads, a first bent portion of the first laminated member being bent in a vertical plane and abutting one of said two side surface of the arm, the first bent portion of the first laminated member having the first support layer, the first insulating layer, and the first conducting layer; and a second suspension connected to the bottom surface of the arm, the second suspension having a second laminated member having a second support layer, a second electrically insulating layer, and a second electrically conducting layer, the second conducting layer being formed into a plurality of electrical leads, a second bent portion of the second laminated member being bent in said vertical plane overlapping the first bent portion of the first suspension, the second bent portion of the second laminate member having the second insulating layer and the second conducting layer with the second insulating layer providing insulation to the first and second conducting layers.

2. The system of claim 1, further comprising a first and second transducer assembly connected to the first and second suspensions, respectively.

3. The system of claim 1, further comprising a connection card connected to the side surface of the arm, the connection card having a plurality of electrical connection pads for connection to said electrical leads of the first and second suspensions.

4. The system of claim 1, wherein the first and second laminated members of the first and second suspensions each have a bending tab formed of the first and second support layers, respectively, for bending the laminated member of each of their bent portions.

5. The system of claim 4, wherein the bending tab has an aperture located beneath the electrically insulating layer and the electrically conducting layers at a position which intersects a line where the bend occurs.

6. A transducer suspension system comprising:

an actuator arm having a top surface, a bottom surface and two side surfaces;

a first suspension connected to the top surface of the arm, the first suspension having a first laminated member having a first support layer, a first electrically insulating layer, and a first electrically conducting layer, the first conducting layer being formed into a plurality of electrical leads, a first bent portion of the first laminated member being bent in a vertical plane and abutting one of said two side surface of the arm, the first bent portion of the first laminated member having the first support layer, the first insulating layer, and the first conducting layer;

a second suspension connected to the bottom surface of the arm, the second suspension having a second laminated member having a second support layer, a second electrically insulating layer, and a second electrically conducting layer, the second conducting layer being formed into a plurality of electrical leads, a second bent portion of the second laminated member being bent in said vertical plane overlapping the first bent portion of the first suspension, the second bent portion of the second laminate member having the second insulating layer and the second overlapping layer with the second insulating layer providing insulation to the first and second conducting layers;

a first transducer element attached to the first suspension;

a second transducer element attached to the second suspension;

a recording media located proximate to each transducer element;

a media movement device for moving the media;

an arm movement device for moving the arm; and an electrical device connected to each of said first and second transducer elements for reading data from the media.

7. The system of claim 6, further comprising a first and second transducer assembly connected to the first and second suspensions respectively.

8. The system of claim 6, further comprising a connection card connected to the side surface of the arm, the connection card having a plurality of electrical connection pads for connection to said electrical leads of the first and second suspensions.

9. The system of claim 6, wherein the first and second laminated members of the first and second suspensions each have a bending tab formed of the first and second support layers, respectively, for bending the laminate member of each of their bent portion.

10. The system of claim 9, wherein the bending tab has an aperture located beneath the electrically insulating layer and the electrically conducting layers at a position which intersects a line where the bend occurs.

* * * * *